(12) United States Patent
Debnath et al.

(10) Patent No.: US 12,266,174 B2
(45) Date of Patent: Apr. 1, 2025

(54) FEW-SHOT ACTION RECOGNITION

(71) Applicant: NEC Laboratories America, Inc., Princeton, NJ (US)

(72) Inventors: Biplob Debnath, Princeton, NJ (US); Srimat Chakradhar, Manalapan, NJ (US); Oliver Po, San Jose, CA (US); Asim Kadav, Mountain View, CA (US); Farley Lai, Santa Clara, CA (US); Farhan Asif Chowdhury, Albuquerque, NM (US)

(73) Assignee: NEC Corporation, Tokyo (JP)

( * ) Notice: Subject to any disclaimer, the term of this patent is extended or adjusted under 35 U.S.C. 154(b) by 373 days.

(21) Appl. No.: 17/862,667

(22) Filed: Jul. 12, 2022

(65) Prior Publication Data

US 2023/0008303 A1 Jan. 12, 2023
US 2023/0049770 A1 Feb. 16, 2023

Related U.S. Application Data (60) Provisional application No. 63/220,623, filed on Jul. 12, 2021.

(51) Int. Cl.
*G06V 20/40* (2022.01)
*G06N 3/08* (2023.01)
*G06V 10/764* (2022.01)
*G06V 10/82* (2022.01)

(52) U.S. Cl.
CPC .............. *G06V 20/41* (2022.01); *G06N 3/08* (2013.01); *G06V 10/764* (2022.01); *G06V 10/82* (2022.01); *G06V 20/46* (2022.01)

(58) Field of Classification Search
CPC ...... G06V 20/41; G06V 10/764; G06V 10/82; G06V 20/46; G06V 20/52; G06N 3/08; G06N 3/0464; G06N 3/084
USPC .......................................... 382/155
See application file for complete search history.

(56) References Cited

U.S. PATENT DOCUMENTS

| | | | |
|---|---|---|---|
| 9,330,171 B1* | 5/2016 | Shetty | G06N 3/08 |
| 2021/0366126 A1* | 11/2021 | Chen | G06T 7/174 |
| 2022/0036538 A1* | 2/2022 | Steiman | G06F 18/24 |
| 2022/0129677 A1* | 4/2022 | Kale | G06N 3/08 |
| 2022/0172700 A1* | 6/2022 | Xiong | G06V 40/172 |
| 2022/0248296 A1* | 8/2022 | Merwaday | H04W 36/125 |
| 2022/0253729 A1* | 8/2022 | Vashist | G06N 5/04 |
| 2022/0272255 A1* | 8/2022 | Xiong | H04N 23/695 |

OTHER PUBLICATIONS

Zhu et al., "Few-shot Action Recognition with Prototype-centered Attentive Learning." arXiv:2101.08085v4 [cs.CV], Mar. 28, 2021, pp. 1-10.

Cao et al., "Few-Shot Video Classification via Temporal Alignment", InProceedings of the IEEE/CVF Conference on Computer Vision and Pattern Recognition, Jun. 2020 (pp. 10618-10627).

(Continued)

*Primary Examiner* — Ali Bayat
(74) *Attorney, Agent, or Firm* — Joseph Kolodka (57) ABSTRACT

Methods and systems of training a neural network include training a feature extractor and a classifier using a first set of training data that includes one or more base cases. The classifier is trained with few-shot adaptation using a second set of training data, smaller than the first set of training data, while keeping parameters of the feature extractor constant.

14 Claims, 5 Drawing Sheets

(56) References Cited

OTHER PUBLICATIONS

Lin et al., "TSM: Temporal Shift Module for Efficient Video Understanding", InProceedings of the IEEE/CVF International Conference on Computer Vision, Nov. 2019 (pp. 7083-7093).
Zhu et al., "Compound Memory Networks for Few-shot Video Classification", InProceedings of the European Conference on Computer Vision (ECCV), Sep. 2018 (pp. 751-766).
Perrett et al., "Temporal-Relational Cross Transformers for Few-Shot Action Recognition", InProceedings of the IEEE/CVF Conference on Computer Vision and Pattern Recognition, Jun. 2021, (pp. 475-484).
Chen et al., "A Closer Look at Few-Shot Classification", arXiv:1904.04232v2 [cs.CV] Jan. 12, 2020, pp. 1-17.

* cited by examiner

FEW-SHOT ACTION RECOGNITION

RELATED APPLICATION INFORMATION

This application claims priority to U.S. Patent Application No. 63/220,623, filed on Jul. 12, 2021, incorporated herein by reference in its entirety.

BACKGROUND

Technical Field

The present invention relates to action recognition, and, more particularly, to recognition of actions with scarce training data available.

Description of the Related Art

While deep learning models can be used for video understanding and embedded vision tasks, such models are generally trained using a large corpus of labeled examples. However, creating such a corpus is often a labor-intensive process. Additionally, for emerging applications, training data may be scarce and few examples of particular actions may be available.

SUMMARY

A method of training a neural network includes training a feature extractor and a classifier using a first set of training data that includes one or more base cases. The classifier is trained with few-shot adaptation using a second set of training data, smaller than the first set of training data, while keeping parameters of the feature extractor constant.

An action classification method includes classifying a video stream to identify an action, using a classification model that includes a feature extractor, trained according to a set of base case examples that do not include the action, and a classifier, trained according to the set of base case examples and a set of separate examples that include the action. A response is performed that is responsive to the identified action.

A system for training a neural network includes a hardware processor and a memory that stores a computer program. When executed by the hardware processor, the computer program causes the hardware processor to train a feature extractor and a classifier using a first set of training data that includes one or more base cases and to train the classifier with few-shot adaptation using a second set of training data, smaller than the first set of training data, while keeping parameters of the feature extractor constant.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Few-shot action recognition may be performed on input video streams to identify situations and activities that occur within a visual field. A few-shot action recognition model may include a feature extractor and a classifier, with both being initially trained using a relatively large corpus of base case training examples. After the initial training, the classifier may be updated with respect to a relatively small set of separate training examples, keeping the parameters of the feature extraction constant during the update. The separate training examples may include an action that is not represented in the base case training examples. This adaptation helps the classifier handle identification of the action of the separate training examples, without affecting the training of the feature extractor.

Multiple types of classifier may be used in conjunction with the feature extraction. For example, a linear classifier or a cosine distance-based classifier may be used to convert the extracted features to a measurement of probabilities that a given action is present in a video stream. Temporal information may be used to capture the inter-frame correlations of a given action. Throughput may be increased using shallow image feature backbones, without significantly reducing performance relative to deeper backbones.

Figure 1:
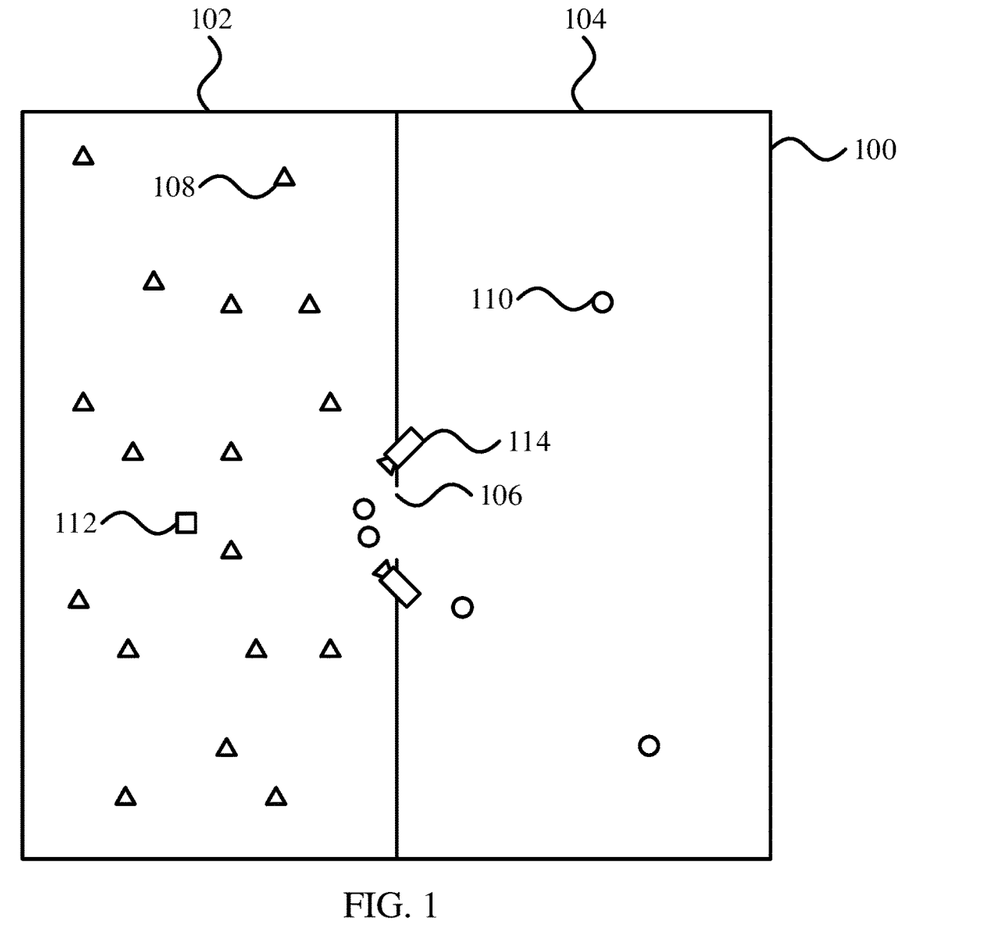
FIG. 1 is a diagram of an exemplary environment that is monitored by video streams with action identification, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap. In some cases, there may be only a single monitored region, with no access controls at all.

A boundary is shown between the uncontrolled region 102 and the controlled region 104. The boundary can be any appropriate physical or virtual boundary. Examples of physical boundaries include walls, fencing, and rope-anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104. For example, the gate 106 may be a turnstile that provides controlled passage between the uncontrolled region 102 and the controlled region 104, where a user can pay or otherwise establish their authorization to gain access to the controlled region 104.

A number of individuals are shown, including unauthorized individuals 108, shown as triangles, and authorized individuals 110, shown as circles. Also shown is an attacker 112, shown as a square. The unauthorized individuals 108 are permitted access to the uncontrolled region 102, but not to the controlled region 104. The authorized individuals are permitted access to both the uncontrolled region 102 and the controlled region 104.

In one example, the attacker 112 may seek to gain access to the controlled region 104 without paying an appropriate fare or otherwise gaining legitimate access. In another example, the attacker 112 may seek to vandalize or damage property, or to negatively impact the other people in the environment 100. These activities may be distinguished from normal activities, or baseline activities, in that they are relatively uncommon. Thus whereas there may be ample training data of an individual walking through a space, there may be relatively little training data relating to an individual jumping over a turnstile.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 capture live streaming video of the individuals in the environment, and particularly of those who attempt to enter the controlled region 104. Other video cameras 114 may monitor high-value objects in the environment 100 or other points of potential conflict.

The video streams generated by the video cameras 114 may be processed to identify actions that take place within the video streams. Although the present embodiments are described in the particular context of an attacker 112, who intentionally seeks to perform unexpected behaviors, it should be understood that the present principles may be applied to any appropriate scenario. Other scenarios may include, for example, monitoring a job site to identify dangerous or anormal behavior or conditions.

Figure 2:
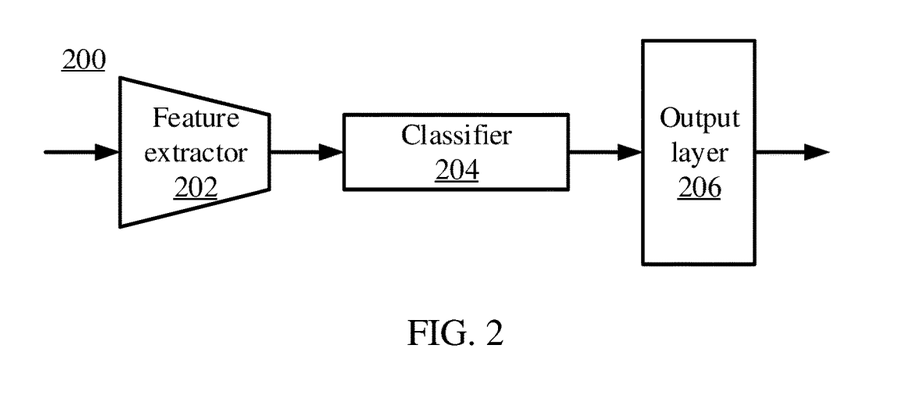
FIG. 2 is a block diagram of an action classification model that includes a feature extractor and a classifier trained according to base case examples and then adapted to a novel action, in accordance with an embodiment of the present invention.

Referring now to FIG. 2, an exemplary model 200 is shown for action recognition in video streams. The model 200 includes a feature extractor 202, which processes input video streams and extracts feature vectors from the input video streams. The features output by the feature extractor 202 are then classified by a classifier 204. An output layer 206 converts the output of the classifier 204 into a set of probabilities, each indicating for example whether a respective action is being performed in the video stream.

As will be described in greater detail below, the feature extractor 202 and the classifier 204 may be trained in different ways. During initial training, both the feature extractor 202 and the classifier 204 maybe trained with base class training data, and error information may be backpropagated to update the weights of both of these parts of the model 200. During an adaptation phase, a relatively small amount of training data relating to a novel class may be used to train only the weights of the classifier 204, with the weights of the feature extractor 202 being held constant.

The feature extractor 202 may be formed from any appropriate feature extraction model. In some embodiments, the feature extractor 202 may include a temporal segment network (TSN), which exploits two-dimensional frame-level features without using temporal information. In other embodiments, a temporal shift module (TSM) can be used to shifts part of the channels of video frames along the temporal dimension to facilitate information exchange among neighboring frames. The temporal shift module leverages temporal information without the use of a complex three-dimensional convolutional neural network (CNN).

When TSN is used in the feature extractor 202, a set of individual frames may be sampled from the video stream. Each may be processed by an image feature extractor to generate respective feature vectors for each of the sampled frames. A segmental consensus step, such as an average pooling operation, may be used to generate a single output video feature for a position in the input video stream based on the feature vectors for the sampled features. Although average pooling is specifically contemplated, it should be understood that other forms of segmental consensus, such as another form of pooling operation, may be used instead.

When TSM is used in the feature extractor 202, information may be temporally shifted between frames of the video stream. The images of the video stream may each include information that is organized into channels. Some channels (e.g., about 20%) may have their information shifted forward or backward in time, by one or more frames. Thus, between a first, second, and third frame of the video, information from channels of the first frame may be shifted to the second frame, and information from those same channels of the second frame may be shifted to the third frame.

The classifier 204 may perform, for example, linear classification or cosine similarity-based classification. Although these options are specifically contemplated, it should be understood that other forms of classification may be used instead. When using linear classification, the classifier 204 may include a linear layer with a weight matrix $W \in \mathbb{R}^{d \times c}$. The raw classification score may be calculated as $S = W^T f_\theta(x_i)$, the dot product between the transpose of the weight matrix and the extracted feature $f_\theta(x_i)$, where $x_i$ is an input image of a video stream.

When using cosine similarity-based classification, a distance-based metric reduces intra-class variation among features during training. Raw classification scores may be determined using a cosine similarity function between feature representations and classification weight vectors. For an extracted feature $f_{\theta+}(x_i)$ and weight matrix $W_+ = [w_1, w_2, \ldots, w_c]$, similarity scores may be determined as $[s_{i,1}, s_{i,2}, \ldots, s_{i,c}]$ for all classes $c \in C$ by calculating a respective cosine similarity to each weight vector, where:

$$s_{i,j} = \frac{f_{\theta_+}(x_i)^T w_j}{\|f_{\theta_+}(x_i)\| \|w_j\|}$$

The output layer 206 may include, for example, a softmax function $\sigma$ to calculate class probability scores $\tilde{y}_i$. The softmax function may normalize the similarity scores to generate probability values between zero and one.

Figure 3:
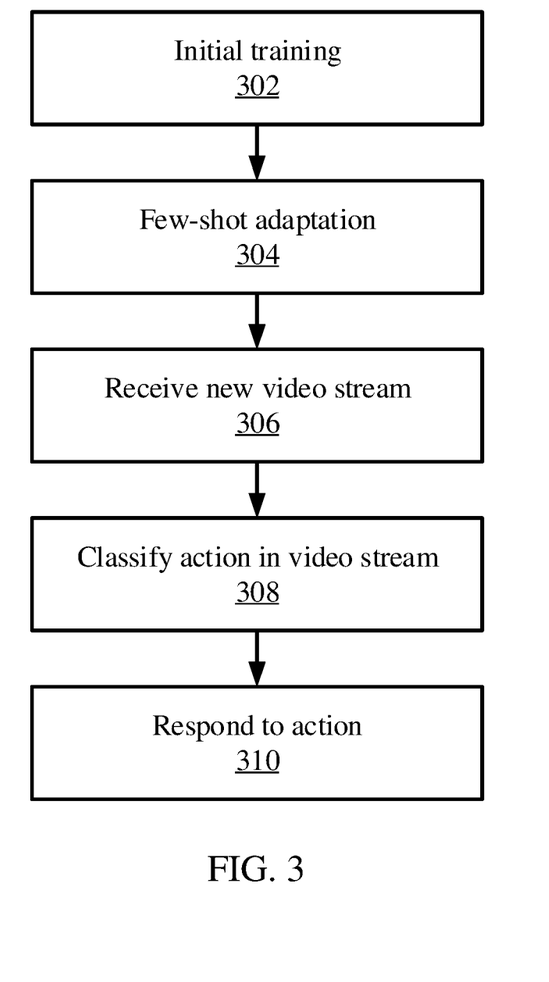
FIG. 3 is a block/flow diagram of a method for training an action classification model, in accordance with an embodiment of the present invention.

Referring now to FIG. 3, a method of training and using an action recognition model is shown. Block 302 performs an initial training based on a relatively large corpus of labeled training data, with the training including updates to both the feature extractor 202 and the classifier 204. Block 304 then performs few-shot adaptation with the parameters of the feature extractor 202 held constant, using a relatively small set of labeled training data for one or more uncommon actions.

During operation in block 306, the video camera(s) 114 generate streams of video information, which are processed by the model 200. The model 200 may process the video information in a manner that includes temporal data, so that actions that are enacted across multiple frames can be detected. Block 308 thereby classifies one or more actions in the video stream, for example being performed by a person within the frame of the video.

Block 310 responds to the action. The response may be tailored to the particular action that has been recognized. For example, if the action is identified as being something forbidden, such as defacing property, the response may trigger an alarm or alert security personnel. In some cases, the action may include making a change to a part of the environment, such as locking or unlocking a door.

The feature extractor 202 may combine a temporal segment network with temporal shifting to leverage temporal information without the use of a three-dimensional CNN. The temporal segment network performs action recognition by dividing the whole video into several uniformly distributed segments along a temporal dimension. The temporal segment network then selects a video frame (e.g., randomly) from each segment to forward through the network, while sharing network weights for all the input frames from all the segments. To extract frame-level features, the temporal segment network uses an image feature extraction network. A segmental consensus can be performed to aggregate information from the sampled video frame from each segment. The segmental consensus can be employed using average pooling, max-pooling, bilinear encoding, or any other appropriate method. The temporal segment method can thereby model long-range temporal information, as it leverages information from the whole video. Sparse sampling lowers the training cost for long video sequences while preserving relevant information.

Temporal shifting shifts part of the channels along the temporal dimension to facilitate information exchange among neighboring frames. The temporal shift may be inserted in the residual branch in a residual block to maintain spatial feature learning capacity. Even after employing a temporal shift, all the information in the original activation is still accessible. Using a temporal shift in a two-dimensional CNN architecture, temporal information modeling can be used without additional computation and parameters.

Figure 4:
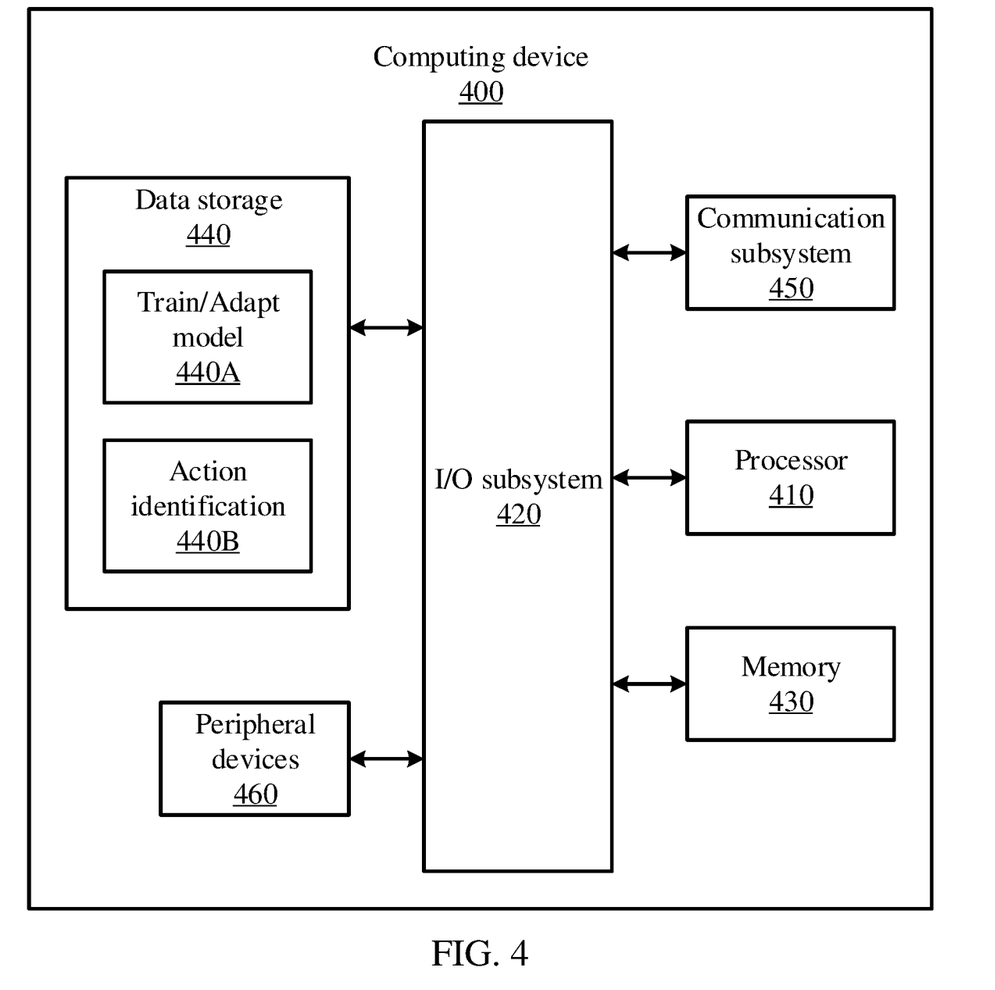
FIG. 4 is a block diagram of a computing device that stores computer program code for training and adapting a model and for action identification, in accordance with an embodiment of the present invention.

Referring now to FIG. 4, an exemplary computing device 400 is shown, in accordance with an embodiment of the present invention. The computing device 400 is configured to perform classifier enhancement.

The computing device 400 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 400 may be embodied as a one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for training and adapting a feature extraction model and program code 440B for retrieving time series information based on a query. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

Figure 5:
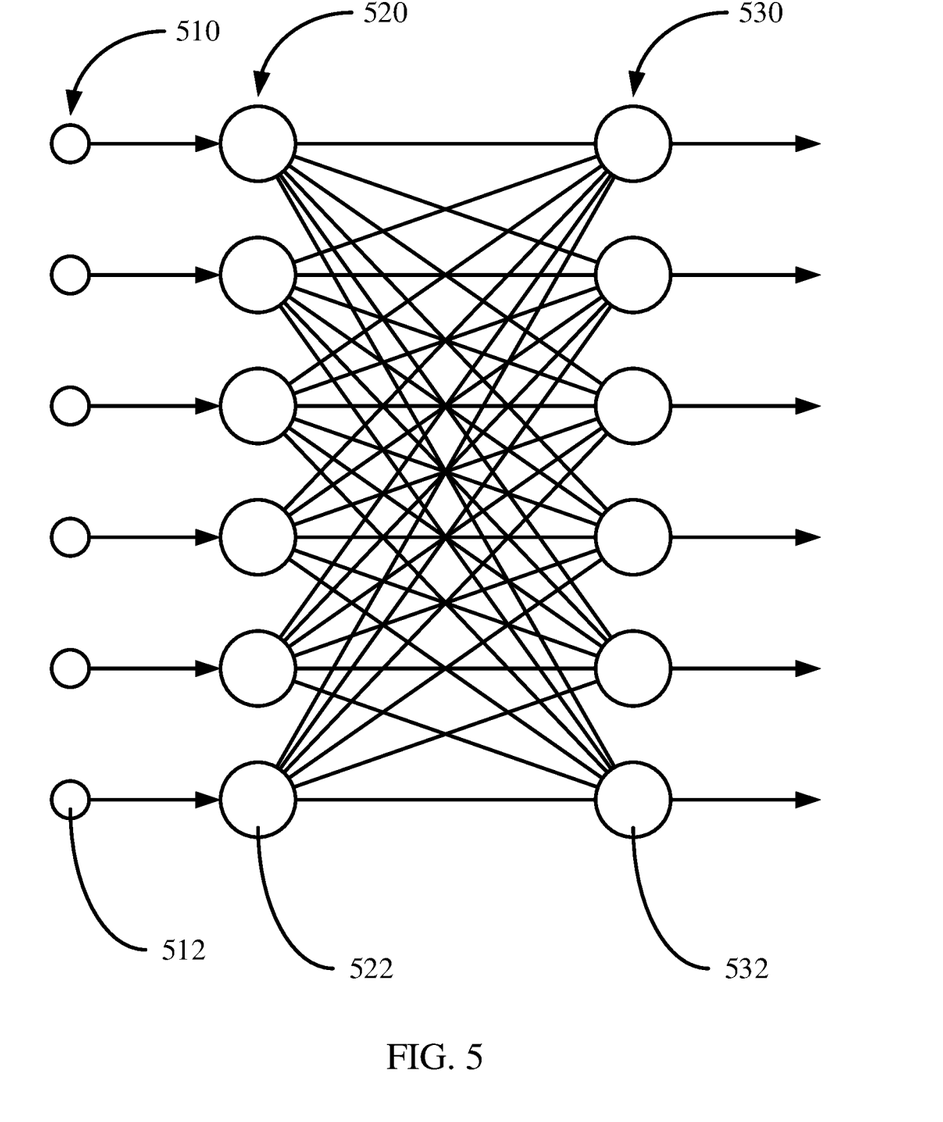
FIG. 5 is a diagram of an exemplary neural network architecture that may be used to implement part of an action classification model, in accordance with an embodiment of the present invention.
Figure 6:
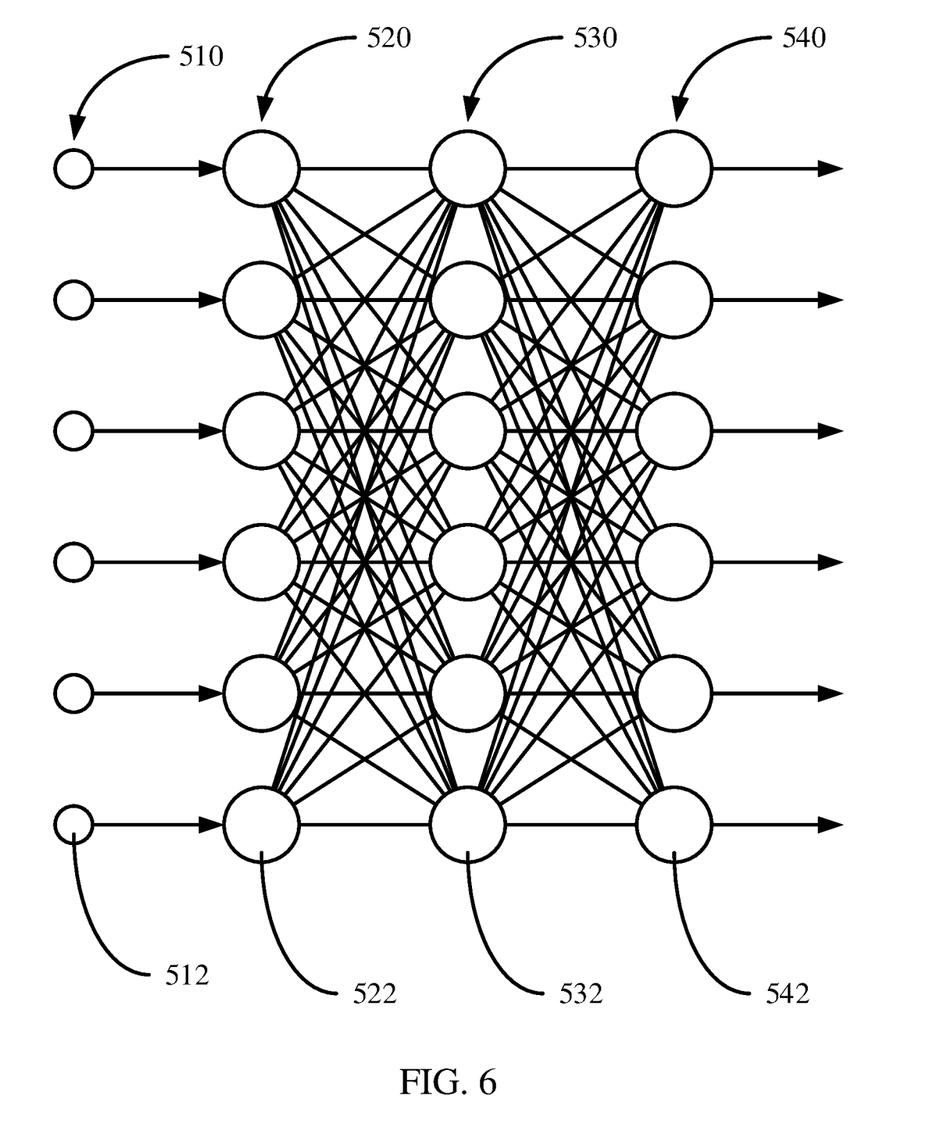
FIG. 6 is a diagram of an exemplary deep neural network architecture that may be used to implement part of an action classification model, in accordance with an embodiment of the present invention.

Referring now to FIGS. 5 and 6, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x,y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 520 of source nodes 522, and a single computation layer 530 having one or more computation nodes 532 that also act as output nodes, where there is a single computation node 532 for each possible category into which the input example could be classified. An input layer 520 can have a number of source nodes 522 equal to the number of data values 512 in the input data 510. The data values 512 in the input data 510 can be represented as a column vector. Each computation node 532 in the computation layer 530 generates a linear combination of weighted values from the input data 510 fed into input nodes 520, and applies a non-linear activation function that is differentiable to the sum. The exemplary simple neural network can perform classification on linearly separable examples (e.g., patterns).

A deep neural network, such as a multilayer perceptron, can have an input layer 520 of source nodes 522, one or more computation layer(s) 530 having one or more computation nodes 532, and an output layer 540, where there is a single output node 542 for each possible category into which the input example could be classified. An input layer 520 can have a number of source nodes 522 equal to the number of data values 512 in the input data 510. The computation nodes 532 in the computation layer(s) 530 can also be referred to as hidden layers, because they are between the source nodes 522 and output node(s) 542 and are not directly observed. Each node 532, 542 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 532 in the one or more computation (hidden) layer(s) 530 perform a nonlinear transformation on the input data 512 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method of training a neural network, comprising:
    training a feature extractor and a classifier, the feature extractor including a time segmentation network, using a first set of training data that includes one or more base cases, wherein the training data includes video and the time segmentation network extracts features from a plurality of frames from the video and uses segmental consensus to generate a feature vector corresponding to the plurality of frames; and
    training the classifier with few-shot adaptation using a second set of training data, smaller than the first set of training data, while keeping parameters of the feature extractor constant.

2. The method of claim 1, wherein the feature extractor is a video feature extractor and the classifier is an action identification model, and wherein the first set of training data includes base case training examples and the second set of training data includes novel training examples for an action that is not represented in the first set of training data.

3. The method of claim 1, wherein the segmental consensus is a pooling operation.

4. The method of claim 1, wherein the feature extractor includes a temporal shift.

5. The method of claim 4, wherein the training data includes video, and wherein the temporal shift shifts information for a channel of a first frame of the video to a second frame of the video.

6. The method of claim 1, wherein the classifier performs linear classification.

7. The method of claim 1, wherein the classifier performs cosine similarity-based classification.

8. A system for training a neural network, comprising:
a hardware processor; and
a memory that stores a computer program, which, when executed by the hardware processor, causes the hardware processor to:
train a feature extractor and a classifier, the feature extractor including a time segmentation network, using a first set of training data that includes one or more base cases, wherein the training data includes video and the time segmentation network extracts features from a plurality of frames from the video and uses segmental consensus to generate a feature vector corresponding to the plurality of frames; and
train the classifier with few-shot adaptation using a second set of training data, smaller than the first set of training data, while keeping parameters of the feature extractor constant.

9. The system of claim 8, wherein the feature extractor is a video feature extractor and the classifier is an action identification model, and wherein the first set of training data includes base case training examples and the second set of training data includes novel training examples for an action that is not represented in the first set of training data.

10. The system of claim 8, wherein the segmental consensus is a pooling operation.

11. The system of claim 8, wherein the feature extractor includes a temporal shift.

12. The system of claim 11, wherein the training data includes video, and wherein the temporal shift shifts information for a channel of a first frame of the video to a second frame of the video.

13. The system of claim 8, wherein the classifier performs linear classification.

14. The system of claim 8, wherein the classifier performs cosine similarity-based classification.

* * * * *